United States Patent Office 3,471,347
Patented Oct. 7, 1969

3,471,347
GELLED NITRIC ACID BLASTING AGENT
George Abraham Cross, New Castle, and James Paul Rishel, Edinburg, Pa., assignors to American Cyanamid Company, Stamford, Conn., a corporation of Maine
No Drawing. Filed Dec. 29, 1967, Ser. No. 694,399
Int. Cl. C06b 1/04, 1/00
U.S. Cl. 149—56    10 Claims

ABSTRACT OF THE DISCLOSURE

Blasting composition comprising nitric acid, a gelling agent and a nitric acid-miscible, soluble or reactive organic fuel comprising either an amine or a heterocycle compound. The composition can contain as additional fuels a nitric acid-miscible, soluble or reactive nitroaromatic compound, nitroparaffin compound or carboxacylic compound. The composition can also contain additional materials such as oxidizers, density modifiers or cross-linking agents.

---

This invention relates to blasting compositions containing nitric acid, a gelling agent and an organic fuel which can be an amine or an heterocycle, mixtures thereof, or mixtures thereof with a carboxylic fuel, a nitroaromatic, or a nitroparaffin. The organic fuel is at least partially nitric acid-soluble or miscible or reactive with nitric acid. This invention relates further to the provision of high strength, blasting compositions in gelled form having as essential components nitric acid, an organic fuel containing an amine or an heterocycle organic compound which is at least partially nitric acid-soluble or miscible or reactive with nitric acid, a gelling agent and water.

Blasting compositions based upon nitric acid and an organic nitrofuel have been known for many years, one of the oldest known blasting compositions being of this type, i.e., the combination of nitric acid and a nitroaromatic compound. Such materials as originally conceived have the severe disadvantage of being in liquid form and corrosive in nature, and thus difficult to handle. Attempts were made to overcome the deficiencies of nitric acid-based explosives since such explosives, by reason of their low cost, are of great commercial importance. Such attempts involved using glass containers with separate internal compartments to contain the nitric acid and keep it separated from the fuel components. These early attempts were far from successful in that the handling of glass containers presents almost insurmountable problems when it is recognized that explosives are used under extremely adverse field conditions.

More recent attempts to prepare useful nitric acid-based explosives involved the use of a gelling agent in combination with an acid-imiscible carbonaceous fuel. The gelling agent increased the viscosity of the explosive without affecting its detonatability. However, because of the presence of such immiscible materials, separation of phases was prone to occur with the formation of corrosive nitric acid exudates.

In view of this state of the art, it is an object of the present invention to provide a blasting composition based upon nitric acid and an organic fuel which is miscible, soluble or reactive with nitric acid. It is a further object of the present invention to provide a blasting composition based upon nitric acid and an organic fuel in the form of a water-containing gel which is less corrosive, of high blasting strength and physically stable under normal field conditions. Other objects will be apparent from the ensuing description of this invention.

In accordance with this invention, it has been discovered that a combination of nitric acid with an organic fuel comprising either an amine or an heterocycle which is at least partially nitric acid-miscible or soluble or reactive with nitric acid and a stable gelling agent is a blasting composition which is capable of detonation under field conditions. Such compositions, in view of the ability of the components to form a single phase system are stable against physical separation and are thus substantially devoid of a free nitric acid phase. The blasting compositions of the present invention may advantageously contain other auxiliary materials which do not materially interfere with their blasting ability. Thus, it may be desirable to add an inorganic nitrate, a density modifying agent and/or a cross-linking agent to enhance the activity of the gelling agent.

The nitric acid which can be used herein is an aqueous solution of 30 to 98% concentration. Nitric acid of about 50 to 90% concentration is very suitable for use in the present invention and such compositions, being readily available in commerce, are preferred. Nitric acid solutions of less than about 50% concentration tend to become insensitive to normally employed detonation techniques.

The organic fuels which are useful in this invention are, as stated above, at least partially acid miscible or soluble or reactive with nitric acid. The degree of solubility or miscibility which is required is dependent on the proportions of the organic fuel in the blasting composition. Solubility or miscibility should be sufficient to permit blending of the nitric acid and fuel components without significant separation of these components into different phases. When the fuel is a solid, it is important that it is sufficiently soluble to be dissolved in the aqueous nitric acid to the extent that it is present. When the fuel is a liquid, it is important that it is acid-miscible to the extent of its presence in the composition since otherwise it will form a second liquid phase which might not gel and would create handling and packaging problems. A small amount of undissolved solid fuel is tolerable within the framework of the present invention. However, it is desirable to minimize the quantity of undissolved fuel components.

The amine organic compounds which are useful in this invention are nitric acid-miscible, soluble or reactive. The amine compounds can be aliphatic or aromatic, and can be substituted with groups including halo, alkyl, alkoxy, hydroxy or amido. The amine fuel can be used alone or in admixture with other nitric acid-miscible, soluble or reactive amine fuels. The amine fuels which are particularly useful in the present invention are benzylamine or hexylamine. Among the aliphatic amines which can be employed are monoethanolamine, diethanolamine, triethanolamine, methylamine, ethylamine, triethylamine, propylamine, hexylamine, ethylenediamine, propylenediamine, butylenediamine, 2-amino-2,3-dimethylbutane, 1-amino-3-methylbutane, aromatic amines such as aniline, N-benzylaniline, N,N-dimethylaniline, 2-methoxyaniline, 4-methoxyaniline, N-methylaniline, 2-chloroaniline, 2-chloro-N-ethylaniline, 2,3-dibromoaniline, 2,3-dimethoxyaniline, 2,6-dimethoxyaniline, benzylamine, menthane diamine, toluene diamine and phenylene diamine.

The nitric acid-soluble, miscible or reactive heterocyclic compound can have five or six-membered rings and can contain sulfur, oxygen or nitrogen in the heterocyclic ring. They can be used either alone or in admixture with different heterocyclic fuels which are nitric acid-miscible, soluble or reactive. The heterocyclic compounds can be unsubstituted or substituted with halo, amino, hydroxy, alkoxy or lower-alkyl groups. The nitropyridine-N-oxide heterocyclic compound is preferred.

Among the heterocyclic compounds which can be employed in this invention are unsubstituted or substituted morpholine, indole, quinoline, pyridine, piperazine, triazine, isopyrrole, pyrazole, triazole, isothiazole, furan, thiophene, nitroquinoline nitrate, nitropyridine-N-oxide or the like.

It is within the scope of the present invention to employ auxiliary fuels in admixture with either the organic amine fuels or the organic heterocyclic fuels. The auxiliary fuels are nitric acid-soluble, miscible or reactive with nitric aicd. The auxiliary fuels can be a nitroaromatic compound, a nitroparaffinic compound or a carboxacyclic compound.

The term "carboxacylic" as used herein means compounds which have at least one carboxy moiety or a moiety which is derived therefrom and has the carboxacyl radical

Examples of such compounds are carboxylic acids, acid salts, anhydrides or amides.

The nitric acid-soluble or miscible nitroaromatic compounds which can be employed as auxiliary fuels have from six to 12 carbon atoms and can be unsubstituted or substituted. The nitroaromatic fuels can be mononitro or polynitro substituted.

Among the nitroaromatics which can be employed in this invention are the substituted nitrobenzyl compounds such as the substituted phenols including 2-amino-6-nitrophenol, 3-bromo-2,4-dinitrophenol, 4-bromo-2,6-dinitrophenol, 4-chloro-2,3-dinitrophenol, 2,3-dinitrophenol, 2,4-dinitrophenol, 2,6-dinitrophenol, 2-methoxy-3-nitrophenol, 4-methylamino-2-nitrophenol, 2,4,5-trinitrophenol and 2,4,6-trinitrophenol; substituted nitrotoluyl compounds including 4-amino-2,6-dinitrotoluene, 2,4-dinitro-6-hydroxytoluene, 3,5-dinitro-2-hydroxytoluene, 3,5-dinitro-4-hydroxytoluene; substituted hydrazine compounds including 2,4-dinitrophenyl hydrazine, 2,6-dinitrophenyl hydrazine and 2-nitrophenyl hydrazine; substituted aniline compounds such aniline picrate, 2-bromo-3,5-dinitroaniline, 4-bromo-2,6-dinitroaniline, 2,4-dinitroaniline, 2,6-dinitroaniline, N-methyl-N-2,4,6-tetranitroaniline; substituted benzaldehyde compounds such as 2,4-dinitrobenzaldehyde, 2,6-dinitrobenzaldehyde, 2-hydroxy-3-nitrobenzaldehyde, 4-hydroxy-3-nitrobenzaldehyde, 2-nitrobenzaldehyde, 3-nitrobenzaldehyde, 4-nitrobenzaldehyde, the isomers of trinitro compounds such as trinitrobenzene, trinitrotoluene, trinitrophenol, trinitrooxylene, trinitromesitylene, trinitroresorcinal, trinitroanisole, trinitroaniline, tetranitroaniline, and the like.

The nitric acid-soluble, miscible or reactive nitro paraffin compounds which can be employed as auxiliary fuels have from 1 to 6 carbon atoms and can be straight chain or branch chain paraffins. The nitroparaffinic fuels can be mononitro or polynitro substituted and can be substituted with halo, amino, or hydroxy groups.

Among the nitroparaffinic compounds which can be employed in this invention are nitromethane, nitroethane, 2-nitro-1,1,1-trifluoroethane, 1-nitropropane, 2-nitropropane, 1-(nitroamino)-propane, 3-nitro-1,1,1-trifluoropropane, 1,6-dinitrohexane, 3-nitropentane, and 1,5-dinitropentane.

The monomeric carboxylic compounds which can be mixed as an auxiliary fuel should have between one and twelve carbon atoms. It may be an acid, anhydride, salt or amide. Monocarboxylic and polycarboxylic derivatives as above noted, whether in monomeric or polymeric form, are useful. Mixtures of different acids, or of acids with the above-noted derivatives of acids, are also useful in the practice of the present invention. Acids and their derivatives may be aliphatic or aryl in structure. The organic acid derivatives which are particularly useful in the present invention are miscible with aqueous nitric acid, since such compositions are highly stable to separation and thus less corrosive. Among the mono acids which can be used in the practice of the present invention are acetic, propionic, butyric, valeric, isopentanoic, methylpentanoic and trimethylacetic acids. Salts of such acids, e.g., ammonium, sodium, potassium, calcium, magnesium, and the like, are also usfeul in the present invention. Of these salts, the preferred members are the alkali metal salts and others which are at least partially soluble in nitric acid. Amides such as acetamide and propionamide can also be used in the practice of the present invention. Likewise, anhydrides such as acetic anhydride, propionic anhydride, and the like, can also be used.

Other aliphatic acids such as acrylic, butenoic, hexenoic acid, as well as anhydrides, amides and salts of these acids can also be used as the carboxacylic fuel component of the composition of this invention.

Aromatic acids such as benzoic acid, phthalic acid, terephthalic acid, cinnamic acid, as well the anhydrides, salts and amides derived therefrom are also useful to supply the oxidizable component of the blasting agent of this invention.

The organic carboxacylic component useful in the composition of the present invention may be substituted by halogen groups. Among such halogen-substituted acids and derivatives which can be used are chloroacetic, dichloroacetic, trichloroacetic, bromopropionic, iodopropionic, dibromobutyric, chlorovaleric, parachlorobenzoic and parachlorocinnamic acids.

Polybasic aliphatic acids as well as anhydrides, partial esters, amides and salts of such acids may also be used to supply the oxidizable carboxacylic component useful in the present invention. Among such polybasic acids are oxalic, malonic, succinic, glutaric, adipic, pimelic, suberic, azelaic, malic, maleic and fumaric. Similarly, alkali metal salts and amides of such polybasic acids may also be used for the practice of the present invention. Also, substituted derivatives of such acids, e.g., halogenated derivatives are also useful for the practice of the present invention.

Polymeric acids, represented by polyacrylic acid, polymethacrylic acid, polymaleic acid and copolymers of such acids with each other or vinyl derivatives such as alkyl vinyl ethers or vinyl halides are also useful herein.

From the foregoing group of carboxacylic compounds, those which are fully miscible or fully soluble in aqueous nitric acid are preferred. Examples of these are the lower alkanoic acids, e.g., acetic acid, propionic acid, aliphatic polybasic acids such as oxalic acid and succinic acid; and polybasic aromatic acids, e.g. phthalic acid.

A gelling agent which is stable in the presence of aqueous nitric acid should be present in the compositions of this invention. The choice of a gelling agent is not critical, so long as the agent is stable and effective in aqueous nitric acid. Among the commercially available materials are water-soluble interpolymers of methyl vinyl ether and maleic anhydride, available under the trade name "Gantrez AN" resins, water soluble copolymers based on the reaction of ammonia and the interpolymer of methyl vinyl ether and maleic anhydride, polyvinylpyrrolidones of various grades, polyacrylic acids and ammonium polyacrylates, copolymers of ethylene and maleic anhydride, copolymers of styrene and maleic anhydride, polyethylene oxide, copolymers of acrylamide and N,N'-methylene bisacrylamide monomers and polyacrylamide. Silica is also a useful gelling agent since it is acid resistant. Examples of commercially available silica are those sold under the names "Cab-O-Sil" and "Santocel." The preferred gelling agents for use in the present invention are: the polymer derived by the copolymerization of methyl vinyl ether and maleic anhydride and their reaction products, silica, and combinations thereof.

Best advantage of the gelling agent is taken by the inclusion in the blasting composition of cross-linking agents capable of functioning with the particular gelling agent used. In many cases, these are metal salts. Thus, preferably, chlorides or sulfates, but also acetates, hydroxides and nitrates of such metals as tin, chromium, lead, zirconium, iron, copper, zinc, nickel, manganese, cobalt, titanium and aluminum may be used.

While the present invention provides a blasting composition which is independent of the use of ammonium nitrate or other oxidants such as sodium nitrate, potassium nitrate, barium nitrate, ammonium perchlorate, or potassium perchlorate, it may be desirable for specific uses to include ammonium nitrate or other oxidants in the blasting composition. When used, ammonium nitrate can be present either as a finely ground material or in the form of fertilizer grade prills.

It is often advantageous to include a density modifying agent in the formulations of the present invention, especially when such formulations are prepared from nitric acid solutions of less than 80% by weight nitric acid. Such density modifying agents are acid-resistant materials which contain entrapped air such as perlite, hollow glass spheres or vermiculite. Other useful materials are frothing agents of the non-ionic surfactant type, for example, esters of sorbitan with fatty acids, e.g., sorbitan monopalmitate, sorbitan monostearate and sorbitan monolaurate.

Blasting compositions of the present invention should contain from 3 to 90% by weight of nitric acid of at least 30% concentration. Additionally, they must have a minimum of about one percent by weight of the fuel and a gelling agent in a weight proportion of about 0.1 to about 10%, based on the weight of the entire composition. Though not entirely necessary, it is desirable to have up to about 5% by weight of a cross-linking agent to enhance the action of the gelling agent. Density modifying agents can be present in a concentration of up to about 10%. When an auxiliary oxidant is used, as much as 80% may be present in the explosive composition.

It is preferred to use for each 100 parts of anhydrous nitric acid, 10 to 130 parts of the organic fuel component, 0 to 700 parts of ammonium nitrate, 1 to 20 parts of the acid-stable gelling agent, 0.1 to 10 parts of the cross-linking agent and 1 to 100 parts of water.

The fuel:oxidizer components in the composition of the present invention should preferably be present in such quantities as to give an "oxygen balanced" composition. By "oxygen balance" is meant the availability of sufficient oxygen in the composition to oxidize the fuel components to their maximum state of oxidation, e.g., combined carbon to carbon dioxide.

The various components of the blasting compositions of this invention can be blended in any convenient manner. It may be necessary to apply heat moderately during the blending steps or to adjust the order of addition of the various components to enable effective blending to take place. The manner of preparing the material is not a part of the present invention.

The following examples are presented to illustrate the present invention. In the examples, parts and percentages are on a weight basis unless otherwise noted. Shooting tests were made in 2½" diameter schedule 40 steel pipe, unless otherwise noted. The designation "EBC" is used to denote electric blasting cap.

Example 1

The following mixture was prepared to illustrate the composition of the present invention in which the fuel is an amine compound:

| | Percent |
|---|---|
| Ammonium nitrate | 69.5 |
| Nitric acid (42° Bé.) | 19.0 |
| Diethanolamine | 9.0 |
| Sorbitan monopalmitate | 1.5 |
| Gantrez AN-169 | 1.0 |

This formulation had the following properties:

| | |
|---|---|
| Density, g./cc. | 1.40 |
| Rate of detonation, m.p.s. | 6320 |
| Cap sensitivity | No. 16 EBC |

Example 2

The following mixture was prepared to illustrate the composition of the present invention in which the fuel is a mixture of an amine and a nitroparaffinic compound and a carboxacylic compound:

| | Percent |
|---|---|
| Ammonium nitrate | 69.5 |
| Nitric acid (42° Bé.) | 17.0 |
| Diethanolamine | 3.0 |
| Nitromethane | 3.5 |
| Glacial acetic acid | 4.5 |
| Sorbitan monopalmitate | 1.5 |
| Gantrez AN-169 | 1.0 |

This formulation had the following properties:

| | |
|---|---|
| Density, g./cc. | 1.41 |
| Rate of detonation, m.p.s. | 4350 |
| Cap sensitivity | No. 16 EBC |

Example 3

The following mixture was prepared to illustrate the composition of the present invention in which the fuel is a heterocyclic compound:

| | Percent |
|---|---|
| Ammonium nitrate | 60.0 |
| 90% nitric acid | 26.5 |
| Morpholine | 10.5 |
| Gantrez AN-169 | 1.0 |
| Sorbitan monopalmitate | 1.5 |
| Chromium nitrate (39% aqueous) | 0.5 |

This formulation had the following properties:

| | |
|---|---|
| Density, g./cc. | 1.51 |
| Rate of detonation, m.p.s. | 5000 |
| Cap sensitivity | No. 16 EBC |

Example 4

The following blasting composition was prepared:

| | Percent |
|---|---|
| Ammonium nitrate | 60.0 |
| Nitric acid (90% aqueous solution) | 21.6 |
| Dinitrotoluene | 12.9 |
| Diethanolamine | 3.0 |
| Sorbitan monopalmitate | 1.5 |
| Gantrez AN-169 | 1.0 |

The formulation had the following properties:

| | |
|---|---|
| Density, g./cc. | 1.52 |
| Rate of detonation, m.p.s. | 3500 |
| Cap sensitivity | No. 8 EBC |

Example 5

The following blasting composition was prepared:

| | Percent |
|---|---|
| Hexylamine | 19.1 |
| Nitric acid (90% aqueous solution) | 76.1 |
| Cab-O-Sil EH-5 | 4.8 |
| | 100.0 |

The formulation had the following properties:

| | |
|---|---|
| Reaction | Yes |
| Rate of detonation, m.p.s., in 1" x 12" steel pipe with booster | 6470 |
| Density, g./cc. | 1.41 |

Example 6

The following blasting composition was prepared:

| | |
|---|---|
| Triethylamine | 19.1 |
| Nitric acid (90% aqueous solution) | 76.1 |
| Cab-O-Sil EH-5 | 4.8 |
| | 100.0 |

The formulation had the following properties:

Reaction _____ Yes
Rate of detonation, m.p.s., in 1" x 12" steel pipe
  with booster _____ 5800
Density, g./cc. _____ 1.39

Example 7

The following blasting composition was prepared:

|  | Percent |
|---|---|
| Ethylene diamine | 15.75 |
| Nitric acid—(90% aqueous solution) | 79.50 |
| Cab-O-Sil EH-5 | 4.75 |
|  | 100.0 |

The formulation had the following properties:

Reaction _____ Yes
Rate of detonation, m.p.s., in 1" x 12" steel pipe
  with booster _____ 5700
Density, g./cc. _____ 1.53

Example 8

The following blasting composition was prepared:

|  | Percent |
|---|---|
| Benzylamine | 21.75 |
| Nitric acid—(90% aqueous solution) | 73.50 |
| Cab-O-Sil EH-5 | 4.75 |
|  | 100.0 |

The formulation had the following properties:

Reaction _____ Yes
Rate of detonation, m.p.s., in 1" x 12" steel pipe
  with booster _____ 7100
Density, g./cc. _____ 1.45

Example 9

The following blasting composition was prepared:

|  | Percent |
|---|---|
| Menthane diamine | 9.0 |
| Nitric acid (90% aqueous solution) | 86.4 |
| Cab-O-Sil EH-5 | 4.6 |
|  | 100.0 |

The formulation had the following properties:

Reaction _____ Yes
Rate of detonation, m.p.s., in 1" x 12" steel pipe
  with booster _____ 5600
Density, g./cc. _____ 1.42

Example 10

The following blasting composition was prepared:

|  | Percent |
|---|---|
| Pyridine | 19.1 |
| Nitric acid (90% aqueous solution) | 76.1 |
| Cab-O-Sil EH-5 | 4.8 |
|  | 100.0 |

The formulation had the following properties:

Reaction _____ Yes
Rate of detonation, m.p.s., in 1" x 12" steel pipe
  with booster _____ 6500
Density, g./cc. _____ 1.40

Example 11

The following blasting composition was prepared:

|  | Percent |
|---|---|
| Nitric acid (90% aqueous solution) | 60.0 |
| Nitropyridine-N-oxide | 36.0 |
| Cab-O-Sil EH-5 | 4.0 |
|  | 100.0 |

The formulation had the following properties:

Reaction _____ No
Rate of detonation, m.p.s., in 1¼" x 8" unconfined _____ 3000
Density, g./cc. _____ 1.30

Example 12

The following blasting composition was prepared:

|  | Percent |
|---|---|
| Quinoline | 24.7 |
| Nitric acid (90% aqueous solution) | 70.5 |
| Cab-O-Sil EH-5 | 4.8 |
|  | 100.0 |

The formulation had the following properties:

Reaction _____ Yes
Rate of detonation, m.p.s., in 1" x 12" steel pipe
  with booster _____ 6550
Density, g./cc. _____ 1.38

Example 13

The following blasting composition was prepared:

|  | Percent |
|---|---|
| Nitroquinoline nitrate | 31.0 |
| Nitric acid (90% aqueous solution) | 62.0 |
| Cab-O-Sil EH-5 | 7.0 |
|  | 100.0 |

The formulation had the following properties:

Reaction _____ No
Rate of detonation, m.p.s., in 1" x 12" steel pipe with
  booster _____ 7250
Density, g./cc. _____ 1.40

We claim:
1. A stable blasting composition of high blasting strength consisting essentially of:
   (a) 3 to 90 weight percent of nitric acid of about 30 to 90% concentration
   (b) at least 1 percent by weight of a nitric-acid miscible or soluble fuel selected from the group consisting of an organic amine compound, an organic heterocycle compound and mixtures thereof; and
   (c) at least 0.1 weight percent of a gelling agent.

2. The composition of claim 1 having up to 80 weight percent of ammonium nitrate.

3. The composition of claim 1 having at least 0.01 weight percent of a cross-linking agent to enhance the activity of the gelling agent.

4. The composition of claim 1 wherein the fuel is benzylamine.

5. The composition of claim 1 wherein the fuel is hexylamine.

6. The composition of claim 1 wherein the fuel is nitropyridine-N-oxide.

7. The composition of claim 1 containing, for each 100 parts of anhydrous nitric acid, 10–70 parts of said fuel; up to 60 parts of an oxidizable fuel selected from the group consisting of a nitroaromatic compound, a nitroparaffin compound, a carboxacylic compound and mixtures thereof; up to 700 parts of ammonium nitrate; 1–20 parts of acid-stable gelling agent; 0.1–10 parts of cross-linking agent; and 1–100 parts of water.

8. The composition of claim 7 wherein the gelling agent is selected from anhydrous silica and a copolymer of methyl vinyl ether and maleic anhydride.

9. The composition of claim 7 wherein said nitric acid miscible or soluble fuel is diethanolamine and said oxidizable fuel in a combination of nitromethane and acetic acid.

10. The composition of claim 7 wherein said nitric acid miscible or soluble fuel is diethanolamine and said oxidizable fuel is dinitrotoluene.

References Cited

UNITED STATES PATENTS

| | | | |
|---|---|---|---|
| 2,325,065 | 7/1943 | Lawrence | 149—74 |
| 2,355,817 | 8/1944 | Morrow | 149—74 |
| 3,216,872 | 11/1965 | Wells | 149—57 X |
| 3,242,019 | 3/1966 | Gehrig | 149—74 X |
| 3,296,044 | 1/1967 | Gehrig | 149—74 X |
| 3,306,789 | 2/1967 | Logan et al. | 149—74 X |
| 3,361,601 | 1/1968 | Chrisp | 149—74 X |

FOREIGN PATENTS 800,167   8/1958   Great Britain.

CARL D. QUARFORTH, Primary Examiner

MELVIN J. SCOLNICK, Assistant Examiner

U.S. Cl. X.R.

149—18, 57, 74, 89, 105, 147